(12) United States Patent
Li et al.

(10) Patent No.: US 9,876,392 B2
(45) Date of Patent: Jan. 23, 2018

(54) REVERSIBLE POWERING DEVICE

(71) Applicant: ZHEJIANG UNIVIEW TECHNOLOGIES CO., LTD, Hangzhou (CN)

(72) Inventors: Haitao Li, Hangzhou (CN); Jianting Wang, Hangzhou (CN); Yifei Sun, Hangzhou (CN)

(73) Assignee: Zhejiang Uniview Technologies Co., Ltd, Hangzhou (CN)

( * ) Notice: Subject to any disclaimer, the term of this patent is extended or adjusted under 35 U.S.C. 154(b) by 238 days.

(21) Appl. No.: 14/765,807

(22) PCT Filed: Apr. 24, 2014

(86) PCT No.: PCT/CN2014/076166
§ 371 (c)(1),
(2) Date: Aug. 4, 2015

(87) PCT Pub. No.: WO2014/173311
PCT Pub. Date: Oct. 30, 2014

(65) Prior Publication Data
US 2015/0380987 A1    Dec. 31, 2015

(30) Foreign Application Priority Data

Apr. 27, 2013   (CN) .......................... 2013 1 0158121

(51) Int. Cl.
*H02J 1/00*      (2006.01)
*H02J 13/00*     (2006.01)
(Continued)

(52) U.S. Cl.
CPC .......... *H02J 13/0003* (2013.01); *H02J 1/108* (2013.01); *H02J 9/061* (2013.01)

(58) Field of Classification Search
CPC ......... H02J 13/0003; H02J 1/108; H02J 9/061
(Continued)

(56) References Cited

U.S. PATENT DOCUMENTS

2011/0080048 A1   4/2011  Lin et al.
2011/0119506 A1   5/2011  Tsai
(Continued)

FOREIGN PATENT DOCUMENTS

CN      101436786 A    5/2009
CN      101707393 A    5/2010
(Continued)

*Primary Examiner* — Thomas Skibinski
(74) *Attorney, Agent, or Firm* — McCoy Russell LLP

(57) ABSTRACT

The present disclosure provides a reversible powering device for an electronic equipment including a first power input port and a second power input port. Said reversible powering device including: a power input determining module configured to determine whether the first power input port or the second power input port of the electronic equipment has a power input respectively, and send a control signal to a switch controlling module if it is determined that the first power input port has a power input and the second power input port has no power input; and the switch controlling module configured to control a switch device according to said control signal such that the power input into the first power input port is output from the second power input port in a reverse direction to power another electronic equipment.

9 Claims, 2 Drawing Sheets

(51) Int. Cl.
*H02J 1/10* (2006.01)
*H02J 9/06* (2006.01)

(58) Field of Classification Search
USPC .................................... 307/1; 320/107–115
See application file for complete search history.

(56) References Cited

U.S. PATENT DOCUMENTS

2011/0121653 A1   5/2011  Hartular et al.
2011/0125341 A1   5/2011  Heath et al.
2012/0229074 A1*  9/2012  Seethaler ............. H02J 7/0021
                                                320/107

FOREIGN PATENT DOCUMENTS

| CN | 102074998 A | 5/2011 |
| CN | 102281145 A | 12/2011 |
| CN | 102497276 A | 6/2012 |
| CN | 102970146 A | 3/2013 |
| JP | 2007036832 A | 2/2007 |

\* cited by examiner

REVERSIBLE POWERING DEVICE

CROSS-REFERENCE TO RELATED APPLICATIONS

The present application is a U.S. National Phase of International Patent Application No. PCT/CN2014/076166, entitled "POWER SUPPLY RETURNING APPARATUS," filed on Apr. 24, 2014, which claims priority to Chinese Patent Application No. 201310158121.4, entitled "POWER SUPPLY RETURNING APPARATUS," filed on Apr. 27, 2013, the entire contents of each of which are hereby incorporated by reference for all purposes.

FIELD OF THE INVENTION

The present invention relates to the field of electronic equipment power supply technology, particularly to a reversible powering device.

BACKGROUND

Surveillance cameras for security-monitoring are often installed with some peripheral equipments including alarming devices, pickups, and 485 controlling equipments etc. A surveillance camera could be powered by an external power supply unit or by POE (Power over Ethernet, which means remote powering over Ethernet, namely transmitting network signals and power to electronic equipments through one networking cable) or POC (Power over Cable, which means transmitting video signals and power to electronic equipments through one coaxial cable). However, peripheral equipments of a surveillance camera are often powered by external power units. FIG. 1 shows a powering mode for prior art surveillance cameras and pickups. The camera is powered by POE, while a 220V AC power is converted into a 12V DC power by an adapter to power the pickup.

SUMMARY

One object of the present invention is to provide a reversible powering device that enables the electronic equipment using the reversible powering device to power another electronic equipment directly.

Another object of the present invention is to reduce the cost for powering equipments.

Yet another object of the present invention is to design a simple and effective reversible powering circuitry for powering other electronic equipments.

The present invention provides a reversible powering device for an electronic equipment including a first power input port and a second power input port, said reversible powering device including: a power input determining module configured to determine whether the first power input port or the second power input port of the electronic equipment has a power input respectively, and send a control signal to a switch controlling module if it is determined that the first power input port has a power input and the second power input port has no power input; and the switch controlling module configured to control a switch device according to said control signal such that the power input into the first power input port is output from the second power input port in a reverse direction to power another electronic equipment.

A reversible powering circuitry includes a first power input port and a second power input port, said first power input port being connected with a first diode at its back, and said second power input port being connected with a second diode at its back, which is characterized in that: the second diode is connected in parallel with a switching device at its two ends; the switching device is connected with a processor and the switching device's on and off are controlled by signals output by the processor; the processor is further connected to the first power input port and the second power input port respectively to receive input status signals for the first power input port and the second power input port after being converted by a level conversion unit respectively so as to decide whether to output power input from the first power input port from the second power input port.

DETAIL DESCRIPTION

Figure 1:
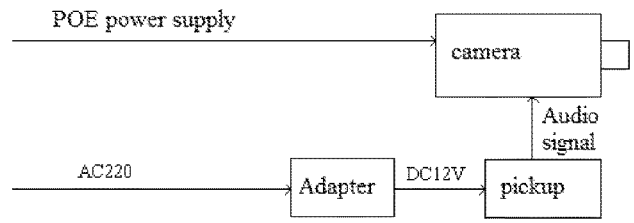
FIG. 1 is a schematic diagram of powering a surveillance camera and a pickup in prior art.

In case of harsh circumstance for equipment installation and restrictive powering, such as in a campus where long distance AC power routing is not allowed, powering peripheral equipments of surveillance cameras is a challenge for engineers. In addition, although the powering mode in FIG. 1 can power surveillance cameras and their peripheral equipments normally, additionally providing power transmission lines and power converting adapters evidently increases costs and reduces reliability. In order to address the above problem, the present disclosure proposes a reversible powering device. The reversible powering device is not only applicable to surveillance cameras and peripheral equipments, but also applicable to other electronic equipments with the same problem. Detail description will be given below with respect to specific exemplary embodiments. The electronic equipment used in the inventive technology must have at least two power input ports.

Figure 2:
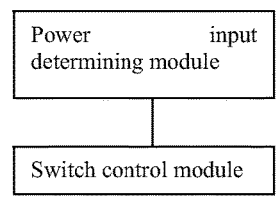
FIG. 2 is a schematic diagram showing logical outcome of an exemplary embodiment of the present invention.

Referring to FIG. 2, the reversible powering device logically includes a power input determining module and a switch controlling module. The power input determining module is configured to determine whether the first power input port and the second power input port of the electronic equipment have a power input. If it is determined that the first power input port has power input while the second power input port has no power input, a control signal is sent to the switch controlling module. The switch controlling module is configured to control a switch device according to said control signal such that the power input into the first power input port can be output from the second power input port in a reverse direction to power another electronic equipment.

The implementation of the technology according to the present exemplary embodiment depends on that the electronic equipment has at least two power input ports. For example, the electronic equipment has a power input port A for powering the electronic equipment in a manner of POE or POC. The electronic equipment further has a power input port B for powering the electronic equipment with DC power. While powering the electronic equipment in practice, it is possible to power the electronic equipment only through the power input port A, or only through the power input port B, or through both power input port A and power input port B. In addition, the two powering modes herein are only examples, and other powering modes are not excluded.

According to an example of the present invention, one original power input port is skillfully used as a power output port for powering peripheral equipments.

From a viewpoint of broader applicability, the reversible powering device of the present exemplary embodiment may further include an enable determining module for determining whether the electronic equipment enables the reversible powering function after the electronic equipment is powered on. If the reversible powering function is enabled, the power input determining module implements said determination. Of course, the module is not necessary for achieving the object of the present disclosure.

Figure 3:
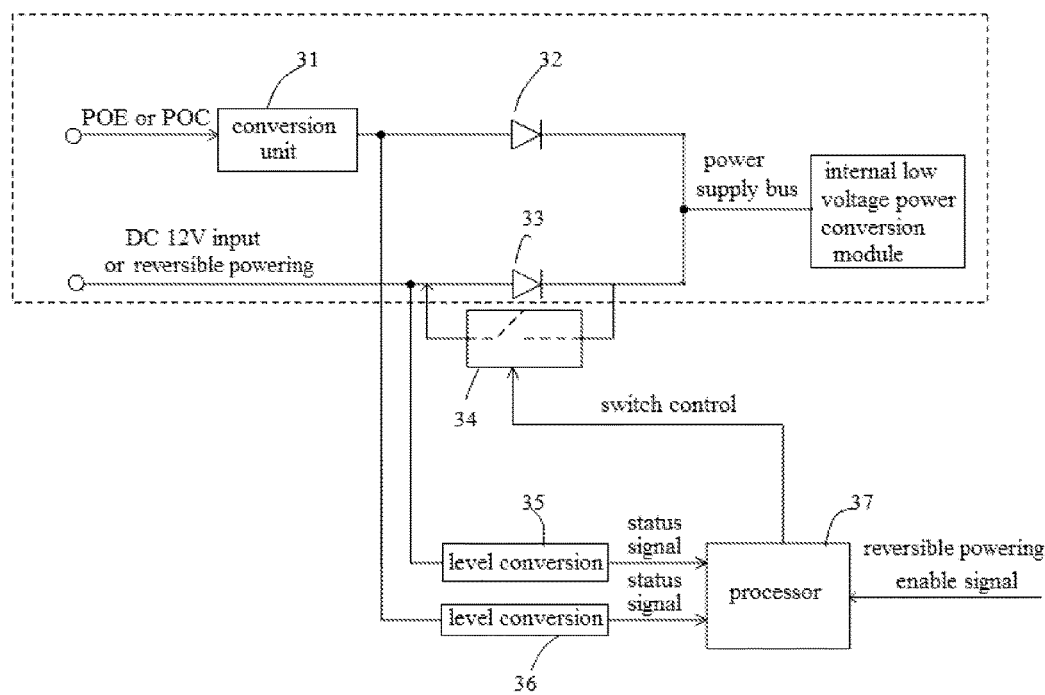
FIG. 3 is a schematic diagram showing a reversible powering device according to an exemplary embodiment of the present invention.

FIG. 3 shows a design chart of a reversible powering output device according to an example of the present disclosure. The design chart includes two sections in which one is a schematic diagram of a power circuit for the electronic equipment and the other is a schematic diagram of the reversible powering output circuitry. FIG. 3 is explained with POE or POC powering and 12V DC power as an example.

The electronic equipment power circuit is shown by a dashed box in the figure. The conversion unit 31 converts power input from POE or POC port into DC power that is output and concentrated to the power bus via a diode 32. Another DC power (DC 12V input) is input from the DC power input port and then output and concentrated to the power bus via another diode 33. It is possible that these two ways of DC power may power the electronic equipment at the same time or only one way powers the electronic equipment. Here, the diodes mainly functions to avoid mutual interference between the POE/POC powering voltage and the 12V voltage in case of being input together. Another function of the diodes is to isolate one and the next stage voltages to and avoid interference with the preceding stage by the next stage.

The schematic diagram of the reversible powering circuitry includes a processor 37 with an output pin connected with a switching device 34 that is connected in parallel to a diode 33. The switching device 34 may be a relay switch, a low on-impedance MOS or other switchable devices. The switch is in off-state by default. The output of the conversion unit 31 is input into the processor 37 via a level conversion circuit 36 and the DC current input from the DC power input port is input into the processor 37 via another level conversion circuit 35. The input to the processor 37 via the level conversion circuits 35 and 36 serves as a powering status signal for the electronic equipment to be detected by the processor 37. Since the input level of the conversion unit 31 and the level required by the processor 37 to be input into itself may mismatch each other, the level conversion circuit 35 is disposed here. Based on the same reason, the level conversion circuit 36 is provided. Since the diodes 32 and 33 can function to isolate preceding and next stage voltages and avoid interference with preceding stage by the next stage, diodes provide guarantee for the processor 37 to determine the powering status signal and avoid misjudgement. The processor 37 may be a dedicated chip, a single chip machine, a CPLD, a FPGA or a DSP. In the scheme of the present exemplary embodiment, the reversible powering function is enable controlled by the enable signal that is input into the processor 37 to implement enable and disable operations.

Figure 4:
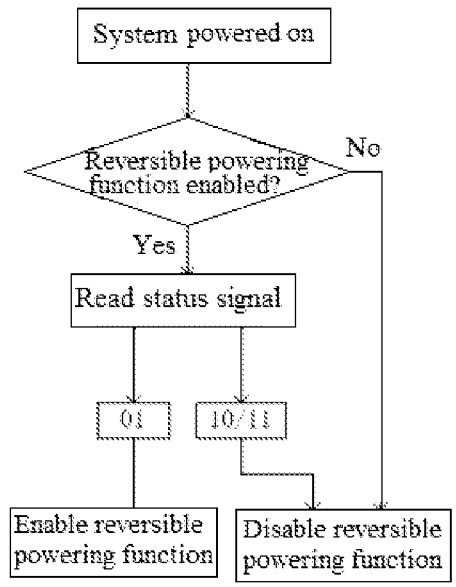
FIG. 4 is an operation flow chart of a system according to an exemplary embodiment of the present invention.

After the electronic equipment is powered on, the work flow of the system according to the present embodiment is as shown in FIG. 4. It is assumed that in case of no power input, the powering status signal into the processor is 0, and in case of power input, the powering status signal into the processor is 1; input to the DC power input port is at high level, and power input to the POE/POC is at low level.

In step S1, after the system is powered on, it is determined whether the reversible powering function is enabled, and if so, the process proceeds to step S2, if not, proceeds to step S4.

The customer can enable or disable the reversible powering function by pressing a button on the electronic equipment or clicking on the operation interface of the software client. If the customer enables the reversible powering function, it means the customer connects a peripheral equipment at the DC 12V input port.

In step S2, the powering status signal is read, when the status signal is 01, the process proceeds to step S3; and when the status signal is 10 or 11, the process proceeds to step S4.

In step S3, reversible powering function is implemented.

In step S4, reversible powering function is disabled.

A status signal of 01 represents input at the POE or POC port and no input at the DC power input port. Now, power can be back fed through the DC power input port.

A status signal of 10 represents no input at POE or POC port and input at DC power input port. Now the reversible powering function is disabled.

A status signal of 11 represents inputs at both two ports. In this case, even if the customer enables the reversible powering function, the system will not provide reversed powering at the DC power input port.

While implementing reversible powering function, referring to FIG. 3, the processor can output signals to close the switch of the switching device such that the DC power from POE or POC port will be output via the switch input port to power the peripheral electronic equipment.

It is to be noted here that the reversible powering enable signal is determined only once after the system is powered on and will not be determined afterwards unless the system is powered on again. Doing so mainly because while implementing reversible powering function, the system status signal will be read as 11, and the reversible powering function should be disabled according to the above-mentioned system flowchart. This would cause the system to enable and disable the reversible powering function continuously, causing the peripheral equipment can not work properly.

Figure 5:
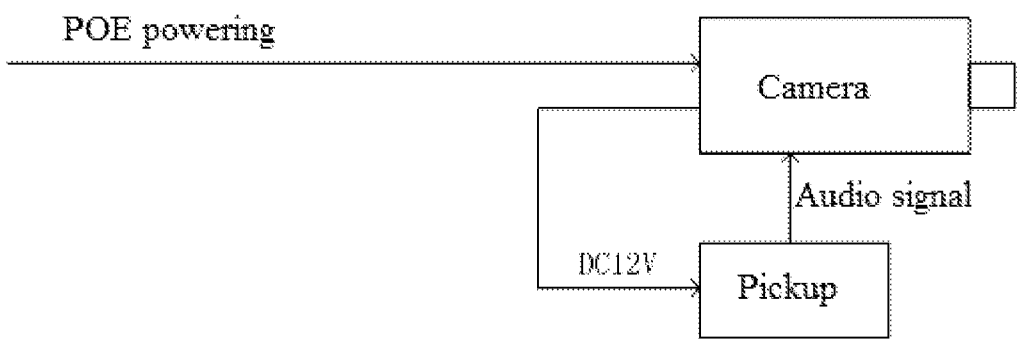
FIG. 5 is a schematic diagram of powering a surveillance camera and a pickup with a example of the inventive technology.

FIG. 5 is a schematic diagram of powering a camera and its peripheral electronic equipment, a pickup using the technology according to an example of the present disclosure. The camera is powered by POE, and the pickup is powered by the DC power output by the power input port of the camera. As compared to the powering mode in FIG. 1, no separate transmission lines and power adapter is needed, which saves costs on the one hand and is simple and convenient on the other hand.

What have been described above are only exemplary preferred embodiments of the present invention and are not intended to limit the present invention. Any modifications, equivalent substitutions and improvements made in the spirit and principle of the present invention are encompassed within the scope of the present invention.

The invention claimed is:

1. A reversible powering device for an electronic equipment comprising a first power input port and a second power input port, wherein said reversible powering device comprises:
   a power input determining module configured to determine whether the first power input port or the second power input port of the electronic equipment has a power input respectively, and send a control signal to a switch controlling module if it is determined that the first power input port has a power input and the second power input port has no power input;
   the switch controlling module configured to control a switch device according to said control signal such that the power input into the first power input port is output from the second power input port in a reverse direction to power another electronic equipment; and
   an enable determining module configured to determine, after the electronic equipment is on, whether a reversible powering function of the electronic equipment is enabled,
   wherein if the reversible powering function is enabled, the power input determining module implements said determination, and
   wherein the determination of the enable determining module is performed only once after the electronic equipment is powered on.

2. The device of claim 1, wherein said second power input port is connected with said switching device at its back such that after the switching device is closed, the power input into the first power input port is output from the second power input port in the reverse direction.

3. The device of claim 1, wherein said power input determining module determines the power input of the electronic equipment according to signals input into itself by said first power input port and said second power input port.

4. The device of claim 1, wherein said first power input port is input with POE or POC power.

5. The device of claim 1, wherein, in a default state, the switch controlling module prohibits power input into the first power input port from being output from the second power input port.

6. The device of claim 1, wherein the electronic equipment to which the reversible powering device is applied is a surveillance camera.

7. A reversible powering circuitry comprising:
   a first power input port and a second power input port, said first power input port being connected with a first diode at its back, and said second power input port being connected with a second diode at its back, wherein:
   the second diode is connected in parallel with a switching device at its two ends;
   the switching device is connected with a processor and the switching device's on and off are controlled by signals output by the processor;
   the processor is further connected to the first power input port and the second power input port respectively to receive input status signals for the first power input port and the second power input port after being converted by a level conversion unit respectively so as to determine whether to output power input from the first power input port from the second power input port;
   the processor further receives an enable signal for determining whether a reversible powering function of the reversible powering circuitry is enabled; and
   the processor determines whether the reversible powering function is enabled according to the received enable signal only once after the reversible powering circuitry is powered on.

8. The reversible powering circuitry of claim 7, wherein said first power input port is input with POE or POC power.

9. The reversible powering circuitry of claim 8, wherein said first power input port is connected with a conversion unit at its back that converts POE or POC power input from the first power input port into DC power.

* * * * *